US012670728B2

(12) United States Patent
Choi

(10) Patent No.: US 12,670,728 B2
(45) Date of Patent: Jun. 30, 2026

(54) METHOD FOR IMAGE PROCESSING FOR CONTROLLING VEHICLE AND ELECTRONIC DEVICE FOR PERFORMING SAME METHOD

(71) Applicant: Nextchip Co., Ltd., Seongnam-si (KR)

(72) Inventor: Hyun Kyu Choi, Seongnam-si (KR)

(73) Assignee: Nextchip Co., Ltd., Seongnam-si (KR)

( * ) Notice: Subject to any disclaimer, the term of this patent is extended or adjusted under 35 U.S.C. 154(b) by 92 days.

(21) Appl. No.: 18/714,742

(22) PCT Filed: Apr. 22, 2022

(86) PCT No.: PCT/KR2022/005809
§ 371 (c)(1),
(2) Date: Nov. 18, 2024

(87) PCT Pub. No.: WO2023/120823
PCT Pub. Date: Jun. 29, 2023

(65) Prior Publication Data
US 2025/0191381 A1     Jun. 12, 2025

(30) Foreign Application Priority Data
Dec. 21, 2021     (KR) ........................ 10-2021-0183353

(51) Int. Cl.
| | |
|---|---|
| *G06T 7/13* | (2017.01) |
| *G06V 10/44* | (2022.01) |
| *G06V 20/56* | (2022.01) |

(52) U.S. Cl.
CPC .............. *G06V 20/588* (2022.01); *G06T 7/13* (2017.01); *G06V 10/44* (2022.01)

(58) Field of Classification Search
CPC ...... G06V 20/588; G06V 10/44; G06V 20/58; G06V 10/7715; G06T 7/13;
(Continued)

(56) References Cited

U.S. PATENT DOCUMENTS

| | | | |
|---|---|---|---|
| 8,346,473 B2 * | 1/2013 | Nakamura | ............. G01C 21/30 |
| | | | 701/28 |
| 10,423,840 B1 * | 9/2019 | Kim | ........................ G08G 1/04 |

(Continued)

FOREIGN PATENT DOCUMENTS

| | | |
|---|---|---|
| CN | 112801021 A | 5/2021 |
| JP | 2003-168123 A | 6/2003 |

(Continued)

OTHER PUBLICATIONS

International Search Report (with English Translation) dated Sep. 13, 2022 for International Application No. PCT/KR2022/005809; 7 Pages.

*Primary Examiner* — Brian P Yenke
(74) *Attorney, Agent, or Firm* — DALY, CROWLEY, MOFFORD & DURKEE, LLP

(57) ABSTRACT

In order to process an image according an embodiment: first detailed feature information may be generated by processing an original image; second detailed feature information may be generated by processing the first detailed feature information; lane type context information may be generated by processing the original image; a type of a target lane in the original image may be determined on the basis of the second detailed feature information and the lane type context information; lane instance context information may be generated by processing the first detailed feature information; and an instance of the target lane may be determined on the basis of the second detailed feature information and the lane instance context information.

16 Claims, 12 Drawing Sheets

(58) Field of Classification Search

CPC . G06T 2207/03256; G06T 2207/30256; G06T 2207/30252; B60R 1/25; B60R 2300/80; H04N 23/695

See application file for complete search history.

(56) References Cited

U.S. PATENT DOCUMENTS

| | | | | |
|---|---|---|---|---|
| 10,816,354 | B2* | 10/2020 | Liu | G01C 21/3658 |
| 10,846,543 | B2* | 11/2020 | Duan | G08G 1/167 |
| 10,943,131 | B2* | 3/2021 | Su | B60W 30/12 |
| 11,600,006 | B2* | 3/2023 | Biswas | G06N 3/09 |
| 11,681,746 | B2* | 6/2023 | Liang | G06V 10/764 |
| | | | | 382/104 |
| 11,847,837 | B2* | 12/2023 | Park | G06V 20/588 |
| 11,851,073 | B2* | 12/2023 | Lin | B60W 50/02 |
| 12,062,242 | B2* | 8/2024 | Awasthi | G06V 10/82 |
| 12,450,689 | B2* | 10/2025 | Song | G06N 3/0464 |
| 2008/0240506 | A1* | 10/2008 | Nakamura | G06V 20/582 |
| | | | | 382/104 |
| 2010/0121569 | A1* | 5/2010 | Nakamura | G01C 21/3658 |
| | | | | 340/995.14 |
| 2018/0068198 | A1* | 3/2018 | Savvides | G06V 40/161 |
| 2019/0063945 | A1* | 2/2019 | Liu | G01C 21/3658 |
| 2019/0138024 | A1* | 5/2019 | Liang | G06N 3/0464 |
| 2019/0266418 | A1* | 8/2019 | Xu | G06V 10/764 |
| 2019/0295420 | A1* | 9/2019 | Fu | G06T 7/73 |
| 2020/0026960 | A1 | 1/2020 | Park et al. | |
| 2020/0134833 | A1* | 4/2020 | Biswas | G06N 3/09 |
| 2020/0285869 | A1* | 9/2020 | Mansour | G06N 3/08 |
| 2021/0035260 | A1* | 2/2021 | Li | G06V 10/44 |
| 2021/0201051 | A1 | 7/2021 | Deselaers et al. | |
| 2021/0365716 | A1* | 11/2021 | Li | G06N 3/09 |
| 2021/0397943 | A1* | 12/2021 | Ribalta | G06N 3/09 |
| 2022/0164584 | A1* | 5/2022 | Singal | G06V 10/44 |
| 2022/0165072 | A1* | 5/2022 | S. | G06V 10/764 |
| 2022/0180644 | A1* | 6/2022 | Awasthi | G06V 20/588 |
| 2022/0272355 | A1* | 8/2022 | Singh | H04N 19/186 |
| 2022/0319196 | A1* | 10/2022 | Shen | G06V 10/774 |
| 2022/0327155 | A1* | 10/2022 | Luo | G06V 10/764 |
| 2022/0349725 | A1* | 11/2022 | Chreptyk | G01C 21/32 |
| 2022/0404169 | A1* | 12/2022 | Ito | G06V 30/1437 |
| 2023/0065725 | A1* | 3/2023 | Badaroglu | G06V 20/40 |
| 2023/0154206 | A1* | 5/2023 | Kim | G06V 20/588 |
| | | | | 382/104 |
| 2023/0245429 | A1* | 8/2023 | He | G06V 10/774 |
| | | | | 382/100 |
| 2023/0368547 | A1* | 11/2023 | Lin | G06V 20/588 |
| 2023/0386223 | A1* | 11/2023 | Oh | G06T 7/73 |
| 2024/0071102 | A1* | 2/2024 | Wu | G06V 10/806 |
| 2025/0078463 | A1* | 3/2025 | Lopez | G06V 10/25 |
| 2025/0078532 | A1* | 3/2025 | Zhao | G06V 10/774 |

FOREIGN PATENT DOCUMENTS

| | | | |
|---|---|---|---|
| JP | 2019-189213 | A | 10/2019 |
| KR | 2019-0003782 | A | 1/2019 |
| KR | 2021-0130222 | A | 10/2021 |

* cited by examiner 510
3 channels
a
original image
(512)

520
16 channels
a/2
first lane type contextual
information (522)

530
16 channels
a/4
second lane type contextual
information (532)

540
32 channels
a/8
third lane type contextual
information (542)

550
64 channels
a/16
fourth lane type contextual
information (552)

560
128 channels
a/32
fifth lane type contextual
information (562)

570
128 channels
a/32
sixth lane type contextual
information (572)

METHOD FOR IMAGE PROCESSING FOR CONTROLLING VEHICLE AND ELECTRONIC DEVICE FOR PERFORMING SAME METHOD

CROSS REFERENCE TO RELATED APPLICATIONS

This application is a U.S. national stage filing under 35 U.S.C § 371 of PCT Application No. PCT/KR2022/005809 filed on Apr. 22, 2022, and entitled "METHOD FOR IMAGE PROCESSING FOR CONTROLLING VEHICLE AND ELECTRONIC DEVICE FOR PERFORMING SAME METHOD," which is based on and claims priority to Korean Patent Application No. 10-2021-0183353, filed on Dec. 21, 2021, which applications are each hereby incorporated herein by reference in their entireties.

TECHNICAL FIELD

The following embodiments relate to a method of processing an image and more particularly, a method of processing an image to control a vehicle.

BACKGROUND ART

With the development of image capturing and processing techniques, a camera may be mounted on a recently manufactured vehicle, and a system for assisting vehicle driving or a system for controlling a vehicle may be provided to a user or the vehicle. The system may obtain information required for driving a vehicle by using an image captured by a camera. The system may provide additional information to the user based on the obtained information or may control the vehicle.

DISCLOSURE OF THE INVENTION

Technical Goals

One embodiment may provide an image processing method performed by an electronic device.

One embodiment may provide an electronic device for processing an image.

However, technical aspects are not limited to the foregoing aspect, and there may be other technical aspects.

TECHNICAL SOLUTIONS

According to one embodiment, an image processing method performed by an electronic device may include receiving an original image generated by using a camera mounted on a vehicle, generating first detail feature information by processing the original image in a preset first scheme and generating second detail feature information by processing the first detail feature information in a preset second scheme, generating lane type contextual information by processing the original image in a preset third scheme, determining a type of a target line in the original image based on the second detail feature information and the lane type contextual information, generating lane instance contextual information by processing the first detail feature information in a preset fourth scheme, and determining an instance of the target line based on the second detail feature information and the lane instance contextual information.

The type of the target line may include at least one of a solid line, a dotted line, a single line, a double line, and a color.

The instance of the target line may include at least one of a left line of a target lane on which the vehicle drives, a right line of the target lane, a line of a left lane of the target lane, and a line of a right lane of the target lane.

The determining of the type of the target line may include generating upsampled lane type contextual information by upsampling the lane type contextual information, generating first reference information based on the upsampled lane type contextual information and the second detail feature information, generating downsampled second detail feature information by downsampling the second detail feature information, generating second reference information based on the downsampled second detail feature information and the lane type contextual information, and determining the type of the target line in the original image based on the first reference information and the second reference information.

The determining of the instance of the target line may include generating downsampled second detail feature information by downsampling the second detail feature information, generating third reference information based on the downsampled second detail feature information and the lane instance contextual information, generating upsampled lane instance contextual information by upsampling the lane instance contextual information, generating fourth reference information based on the upsampled lane instance contextual information and the second detail feature information, and determining the instance of the target line in the original image based on the third reference information and the fourth reference information.

The determining of the instance of the target line in the original image based on the third reference information and the fourth reference information may include generating line existence information based on the line instance contextual information, generating fusion information by fusing the third reference information and the fourth reference information, and determining the instance of the target line based on the line existence information and the fusion information.

The image processing method may be performed by a model pre-trained based on a neural network.

The image processing method may further include controlling the vehicle based on at least one of the type and the instance of the target line.

According to one embodiment, an electronic device may include a memory configured to store a program for processing an image, and a processor configured to execute the program, wherein the processor may be configured to receive an original image generated by using a camera mounted on a vehicle, generate first detail feature information by processing the original image in a preset first scheme and generate second detail feature information by processing the first detail feature information in a preset second scheme, generate lane type contextual information by processing the original image in a preset third scheme, determine a type of a target line in the original image based on the second detail feature information and the lane type contextual information, generate lane instance contextual information by processing the first detail feature information in a preset fourth scheme, and determine an instance of the target line based on the second detail feature information and the lane instance contextual information.

The type of the target line may include at least one of a solid line, a dotted line, a single line, a double line, and a color.

The instance of the target line may include at least one of a left line of a target lane on which the vehicle drives, a right line of the target lane, a line of a left lane of the target lane, and a line of a right lane of the target lane.

The processor may be configured to generate upsampled lane type contextual information by upsampling the lane type contextual information, generate first reference information based on the upsampled lane type contextual information and the second detail feature information, generate downsampled second detail feature information by downsampling the second detail feature information, generate second reference information based on the downsampled second detail feature information and the lane type contextual information, and determine the type of the target line in the original image based on the first reference information and the second reference information.

The processor may be configured to generate downsampled second detail feature information by downsampling the second detail feature information, generate third reference information based on the downsampled second detail feature information and the lane instance contextual information, generate upsampled lane instance contextual information by upsampling the lane instance contextual information, generate fourth reference information based on the upsampled lane instance contextual information and the second detail feature information, and determine the instance of the target line in the original image based on the third reference information and the fourth reference information.

The processor may be configured to generate line existence information based on the line instance contextual information, generate fusion information by fusing the third reference information and the fourth reference information, and determine the instance of the target line based on the line existence information and the fusion information.

The electronic device may be included in the vehicle.

The processor may be configured to control the vehicle based on the type and the instance of the target line.

According to one embodiment, a vehicle control method performed by an electronic device may include receiving an original image generated by using a camera mounted on a vehicle, generating first detail feature information by processing the original image in a preset first scheme and generating second detail feature information by processing the first detail feature information in a preset second scheme, generating lane type contextual information by processing the original image in a preset third scheme, determining a type of a target line in the original image based on the second detail feature information and the lane type contextual information, generating lane instance contextual information by processing the first detail feature information in a preset fourth scheme, determining an instance of the target line based on the second detail feature information and the lane instance contextual information, and controlling the vehicle based on at least one of the type and the instance of the target line.

Effects of the Invention

An image processing method performed by an electronic device may be provided.

An electronic device for processing an image may be provided.

BEST MODE FOR CARRYING OUT THE INVENTION

Figure 1:
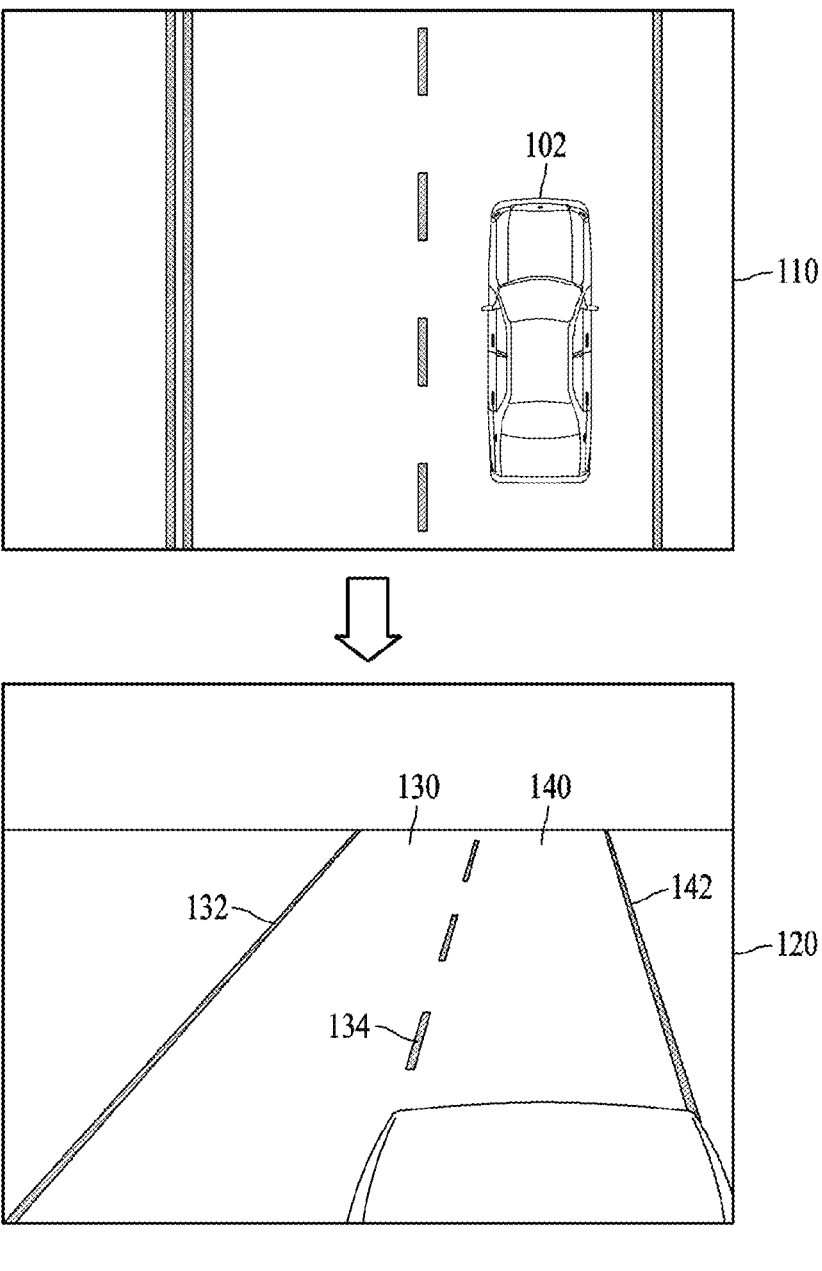
FIG. 1 illustrates an image obtained by capturing an environment of a road on which a vehicle is located and the front of the vehicle according to one embodiment.

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like components, and any repeated description related thereto will be omitted.

FIG. 1 illustrates an image obtained by capturing an environment of a road on which a vehicle is located and the front of the vehicle according to one embodiment.

A road environment 110 in one embodiment is illustrated. For example, the road environment 110 may be a two-lane road and a vehicle 102 may be located in a second lane. A driver may recognize the road environment 110 through lines dividing the lanes.

For example, a driver of the vehicle 102 may recognize lines 132, 134, and 142 through a front windscreen of the vehicle, may distinguish a first lane 130 and a second lane 140 through the lines 132, 134, and 142, and may control the vehicle 102 to maintain a current lane (e.g., the second lane 140) of a vehicle 102.

According to one embodiment, the recognition of the road environment 110 as described above may be performed by an electronic device included in the vehicle 102. For example, the electronic device configured to control the vehicle 102 may capture a front scene of the vehicle 102 using the camera, may detect a line in a generated image based on the image, and may control the driving of the vehicle 102 based on the detected line.

According to one embodiment, semantics of the detected line may need to be determined by the electronic device to control the driving of the vehicle 102. For example, the semantics of the line may include a type of line. For example, the type of the line may include at least one of a solid line, a dotted line, a single line, double lines, and a color.

According to one embodiment, a lane in which the vehicle 102 drives may need to be distinguished from other lanes to control the vehicle 102. The lanes may be distinguished based on a line, and an indication of whether the detected line relates to a corresponding lane may be determination of an instance of the line. For example, an instance determined for a target line may include at least one of a left line of a target lane on which the vehicle drives, a right line of the target lane, a line of a left lane of the target lane, and a line of a right lane of the target lane.

The electronic device configured to control the vehicle 102 may control driving of the vehicle 120 by determining a type and an instance of the line shown in the image. Hereinafter, a detailed description of a method of determining a type and an instance of a line in an image is provided.

Figure 2:
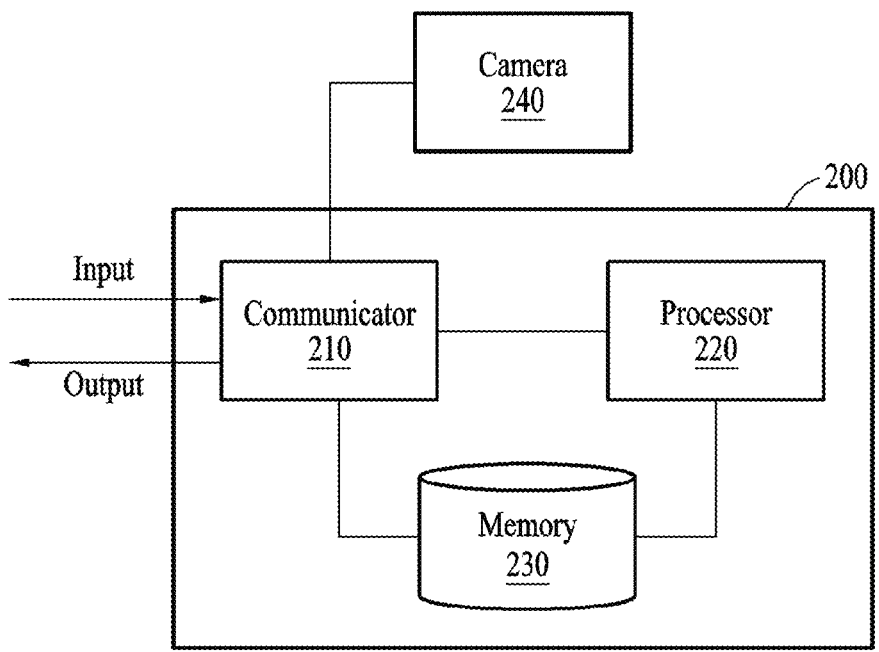
FIG. 2 is a diagram of a configuration of an electronic device according to one embodiment.

FIG. 2 is a diagram of a configuration of an electronic device according to one embodiment.

According to one aspect, an electronic device 200 (e.g., the electronic device of the vehicle 102 of FIG. 1) may include a communicator 210, a processor 220, and a memory 230. Additionally, the electronic device 200 may further include a camera 240. When the electronic device 200 does not directly include the camera 240, the electronic device 200 may be connected to the camera 240.

According to one embodiment, the electronic device 200 may be included in a vehicle. For example, the electronic device 200 may be a device, such as an electronic control unit (ECU) or a body control module (BCM). As another example, the electronic device 200 may be an independent device connected to an ECU or BCM.

The communicator 210 may be connected to the processor 220, the memory 230, and the camera 240 and may transmit or receive data. The communicator 210 may be connected to another external device and may transmit or receive data. Hereinafter, transmitting and receiving "A" may refer to transmitting and receiving "information or data indicating A".

The communicator 210 may be implemented as circuitry in the electronic device 200. For example, the communicator 210 may include an internal bus and an external bus. As another example, the communicator 210 may be an element that connects the electronic device 200 to the external device. The communicator 210 may be an interface. The communicator 210 may receive data from the external device and transmit the data to the processor 220 and the memory 230.

The processor 220 may process data received by the communicator 210 and stored in the memory 230. A "processor" described herein may be a hardware-implemented data processing device having a physically structured circuit to execute desired operations. For example, the desired operations may include code or instructions in a program. For example, the hardware-implemented data processing device may include a microprocessor, a central processing unit (CPU), a processor core, a multi-core processor, a multiprocessor, an application-specific integrated circuit (ASIC), and a field-programmable gate array (FPGA).

The processor 220 may execute computer-readable code (e.g., software) stored in a memory (e.g., the memory 230) and instructions triggered by the processor 220.

The memory 230 may store data received by the communicator 210 and data processed by the processor 220. For example, the memory 230 may store the program (or an application, or software). The program to be stored may be a set of syntaxes that are coded to output an image and are executable by the processor 520.

The memory 230 may include at least one volatile memory, non-volatile memory, random-access memory (RAM), flash memory, a hard disk drive, and an optical disc drive.

The memory 230 may store an instruction set (e.g., software) for operating the electronic device 200. The instruction set for operating the electronic device 200 is executed by the processor 220.

The communication unit 510, the processor 520, and the memory 530 will be described in detail below with reference to FIGS. 6 through 8.

Figure 3:
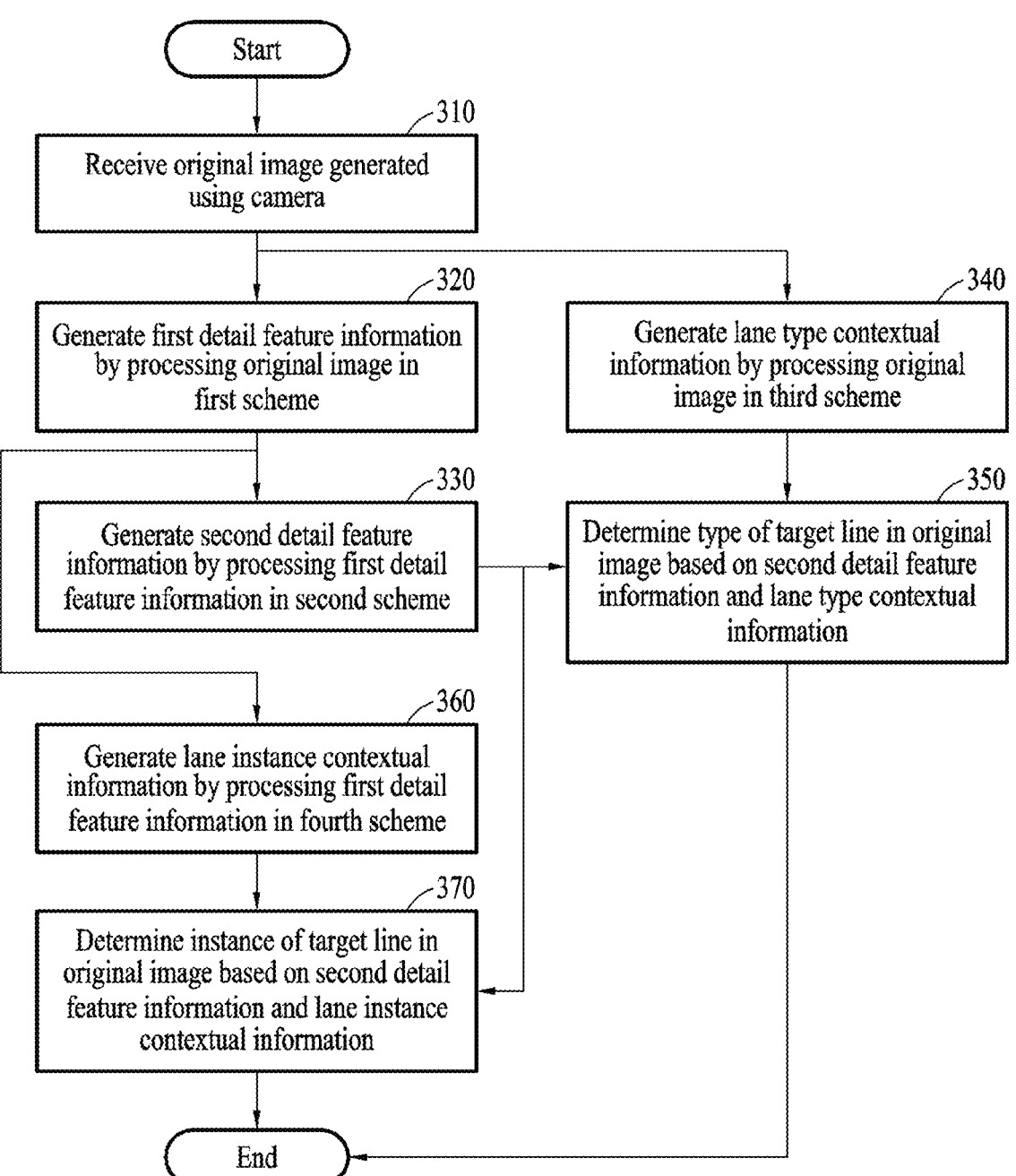
FIG. 3 is a flowchart of an image processing method according to one embodiment.

FIG. 3 is a flowchart of an image processing method according to one embodiment.

Operations 310 to 360 described below may be performed by the electronic device 200 described above with reference to FIG. 2.

In operation 310, the electronic device 200 may receive an original image from the camera 240. For example, the original image may be an image formed of three channels, which are a red (R) channel, a green (G) channel, and a blue (B) channel. As another example, the original image may be an image formed of four channels further including an infrared (IR) channel in addition to the three channels.

According to one embodiment, the electronic device 200 may control the camera 240 to generate the original image. For example, the original image may be consecutively generated at a preset cycle.

In operation 320, the electronic device 200 may generate first detail feature information by processing the original image in a first scheme. According to one embodiment, second detail feature information may indicate a feature related to a portion of a line. For example, the first scheme may refer to applying one or more convolutional layers to the original image.

According to one embodiment, the electronic device 200 may generate the first detail feature information on the original image by using first layers of which respective parameters are pre-trained. For example, the first layers of which parameters are pre-trained may be convolutional layers. The convolutional layer may be a portion of a plurality of layers in a model that is pre-trained based on a neural network. The convolutional layer may be a Conv2D layer used for image processing.

According to one embodiment, the first layers may be a portion of a plurality of layers constituting a filter. For example, when a size of the original image is a and the original image is three channels, the generated first detail feature information may be a size of a/4 and may be 64 channels. A detailed description of the first detail feature information is provided with reference to FIG. 4 below.

According to one embodiment, line pixels determined to constitute a line may be determined from pixels in the original image based on the second detail feature information.

In operation 330, the electronic device 200 may generate the second detail feature information by processing the first detail feature information in a second scheme. For example, the second scheme may refer to applying one or more convolutional layers to the first detail feature information.

According to one embodiment, the electronic device 200 may generate the second detail feature information on the first detail feature information using second layers of which respective parameters are pre-trained. For example, the second layers of which parameters are pre-trained may be convolutional layers. The convolutional layer may be a Conv2D layer used for image processing.

According to one embodiment, the second layers may be a portion of a plurality of layers constituting a filter. The first layers and the second layers may constitute a filter. For example, when a size of the first detail feature information is a/4 and the first detail feature information is 64 channels, the generated second detail feature information may be a size of a/8 and may be 128 channels. A detailed description of the second detail feature information is provided with reference to FIG. 4 below.

According to one embodiment, a feature related to the original image indicated by the second detail feature information may include at least one of gray-scale, blurry, x-axis gradient, y-axis gradient, gradient, target gradient processed by a threshold value, and closed gradient processing the target gradient.

In operation 340, the electronic device 200 may generate lane type contextual information by processing the original image in a third scheme. According to one embodiment, the lane type contextual information may indicate a feature on the entire line. For example, the third scheme may refer to applying one or more layers to the original image.

According to one embodiment, the electronic device 200 may generate the lane type contextual information on the original image by using third layers of which respective parameters are pre-trained. For example, the third layers of which the parameters are pre-trained may generate the lane type contextual information based on the original image by performing stem, gather and expansion (GE), and context embedding (CE).

For example, the third layers may include a first sublayer configured to generate first sub-information of which the size is a/2 and 16 channels based on the original image of which the size is a and 3 channels, and may include a second sublayer configured to generate second sub-information of which the size is a/4 and 16 channels based on the first sub-information. The first sublayer and the second sublayer of the third layers may be layers for stem.

For example, the third layers may include a third sublayer configured to generate third sub-information of which the size is a/8 and 32 channels based on the second sub-information, a fourth sublayer configured to generate fourth sub-information of which the size is a/16 and 64 channels based on the third sub-information, and a fifth sublayer configured to generate fifth sub-information of which the size is a/32 and 128 channels based on the fourth sub-information. The third sublayer, the fourth sublayer, and the fifth sublayer may be layers for GE.

For example, the third layers may include a sixth sublayer configured to generate sixth sub-information of which the size is a/32 and 128 channels based on the fifth sub-information. The sixth sublayer may be a layer for CE. The generated sixth sub-information may correspond to the lane type contextual information.

Operation 340 may operate independently and in parallel with operations 320 and 330 described above. For example, layers performing operations 320 and 330 (e.g., the first layer and the second layer) may be different from layers performing operation 340 (e.g., the third layers), wherein the layers process the same input (e.g., the original image).

In operation 350, the electronic device 200 may determine a type of a target line in the original image based on the second detail feature information and the lane type contextual information. For example, the type of the target line may include at least one of a solid line, a dotted line, a single line, double lines, and a color. For example, the electronic device 200 may determine a line type for each line pixel determined to constitute a line in the original image.

The method of determining the type of the target line in the original image is further described with reference to FIG. 6 below.

In operation 360, the electronic device 200 may generate lane instance contextual information by processing the first detail feature information generated as a result of operation 320 in a fourth scheme. For example, the fourth scheme may refer to applying one or more layers to the first detail feature information.

The lane instance contextual information may be information used for determining an instance of a line and the instance of a line may be information on a relative position of the line based on a position of a vehicle. For example, the instance of a line may include at least one of a left line of a target lane on which the vehicle drives, a right line of the target lane, a line of a left lane of the target lane, and a line of a right lane of the target lane.

According to one embodiment, the electronic device 200 may generate line instance contextual information on the first detail feature information (or the original image) using fourth layers of which parameters are pre-trained. For example, the fourth layers of which the parameters are pre-trained may generate the lane instance contextual information based on the first detail feature information by performing GE and CE.

For example, the fourth layers may include a first sublayer configured to generate first sub-information of which the size is a/16 and 64 channels based on the first detail feature information of which the size is a/4 and 64 channels, and may include a second sublayer configured to generate second sub-information of which the size is a/32 and 128 channels based on the first sub-information. The first sublayer and the second sublayer of the fourth layers may be layers for GE.

For example, the fourth layers may include a third sublayer configured to generate third sub-information of which the size is a/32 and 128 channels based on the second sub-information. The third sublayer may be a layer for CE.

According to one embodiment, the electronic device 200 may generate the lane instance contextual information based on the original image, but may increase operation speed and may reduce memory usage by using the first detail feature information instead of the original image.

In operation 370, the electronic device 200 may determine the instance of the target line in the original image based on the second detail feature information and the lane instance contextual information. For example, the instance of the target line may include at least one of a left line of a target lane on which the vehicle drives, a right line of the target lane, a line of a left lane of the target lane, and a line of a right lane of the target lane. For example, the electronic device 200 may determine the instance of the line for each pixel (e.g., a road pixel) in the original image.

The method of determining the instance of the target line in the original image is further described with reference to FIGS. 7 and 8 below.

According to one embodiment, operations 310 to 370 may be performed by a model pre-trained based on a neural network and layers of operations 310 to 370 may be layers constituting the model. Each parameter value of layers constituting the model may be preset through training. For example, an entity (e.g., a manager) that trains the model may train the model using a sample image having a ground truth (GT) value. The structure of the model and the method of training the model are not limited to a specific embodiment.

According to one embodiment, the electronic device 200 may control the vehicle based on at least one of the type and instance of the target line. For example, the electronic device 200 may control the vehicle to recognize the left line and the right line related to the lane on which the vehicle drives and may control the vehicle to maintain and drive on the current lane based on the recognized lines. As another example, when the lane in which the vehicle currently drives is a second lane, the electronic device 200 may recognize that the vehicle may drive on the first lane, which is the left lane, and the vehicle may not further cross the line because the left line of the first lane is the center line.

Figure 4:
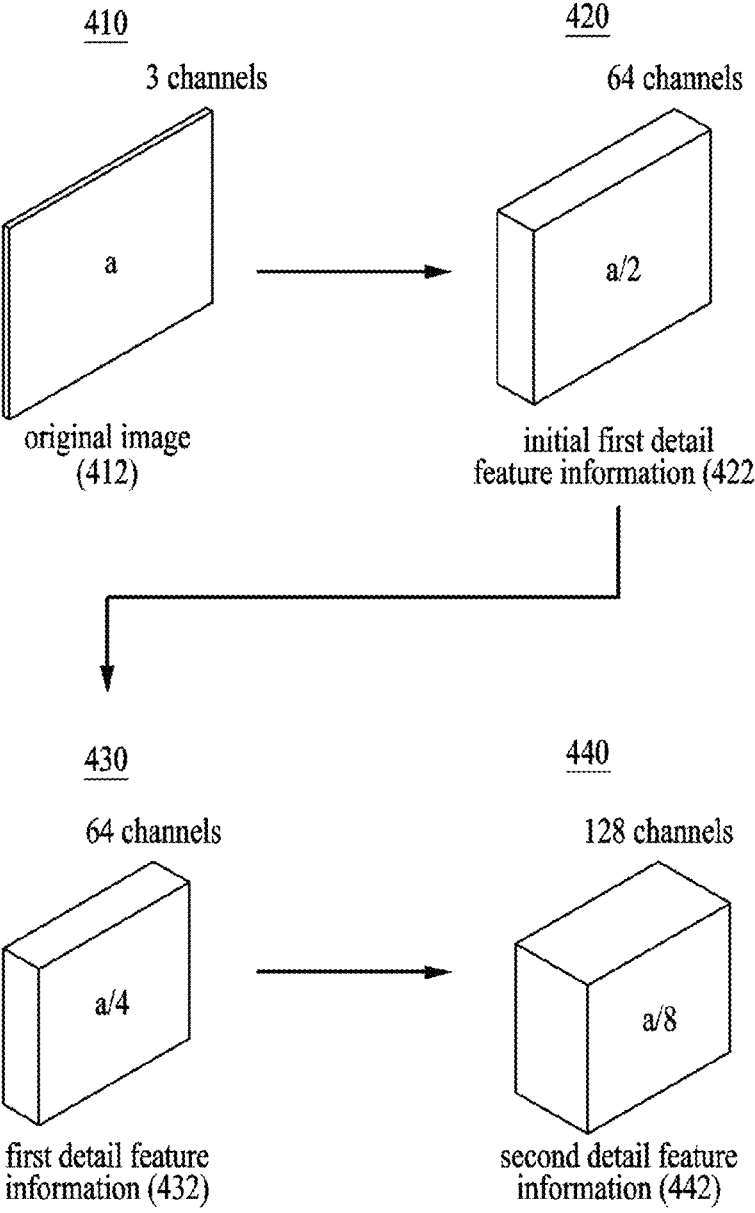
FIG. 4 illustrates a method of generating first detail feature information and second detail feature information according to one embodiment.

FIG. 4 illustrates a method of generating first detail feature information and second detail feature information according to one embodiment.

According to one embodiment, operation 410 may be an operation (e.g., operation 310 of FIG. 3) of receiving an original image, operations 420 and 430 may be operations (e.g., operation 320 of FIG. 3) for generating first detail feature information based on the original image, and operation 440 may be an operation (e.g., operation 330 of FIG. 3) for generating second detail feature information based on the first detail feature information.

In operation 410, the electronic device 200 may receive an original image 412. For example, the original image 412 may have the size of a and 3 channels.

In operation 420, the electronic device 200 may generate initial first detail feature information 422 using a convolutional layer receiving the original image as an input. For example, the initial first detail feature information may have the size of a/2 and 64 channels.

In operation 430, the electronic device 200 may generate first detail feature information 432 using a convolutional layer receiving the initial first detail feature information as an input. For example, the first detail feature information 432 may have the size of a/4 and 64 channels.

According to one embodiment, the first detail feature information 432 may be used for generating lane instance contextual information.

In operation 440, the electronic device 200 may generate second detail feature information 442 by using a convolutional layer receiving the first detail feature information as an input. For example, the second detail feature information 442 may have the size of a/8 and 128 channels.

According to one embodiment, the second detail feature information 442 may be used for generating the lane type contextual information.

According to one embodiment, the second detail feature information 442 may be used for generating the lane instance contextual information.

Figure 5:
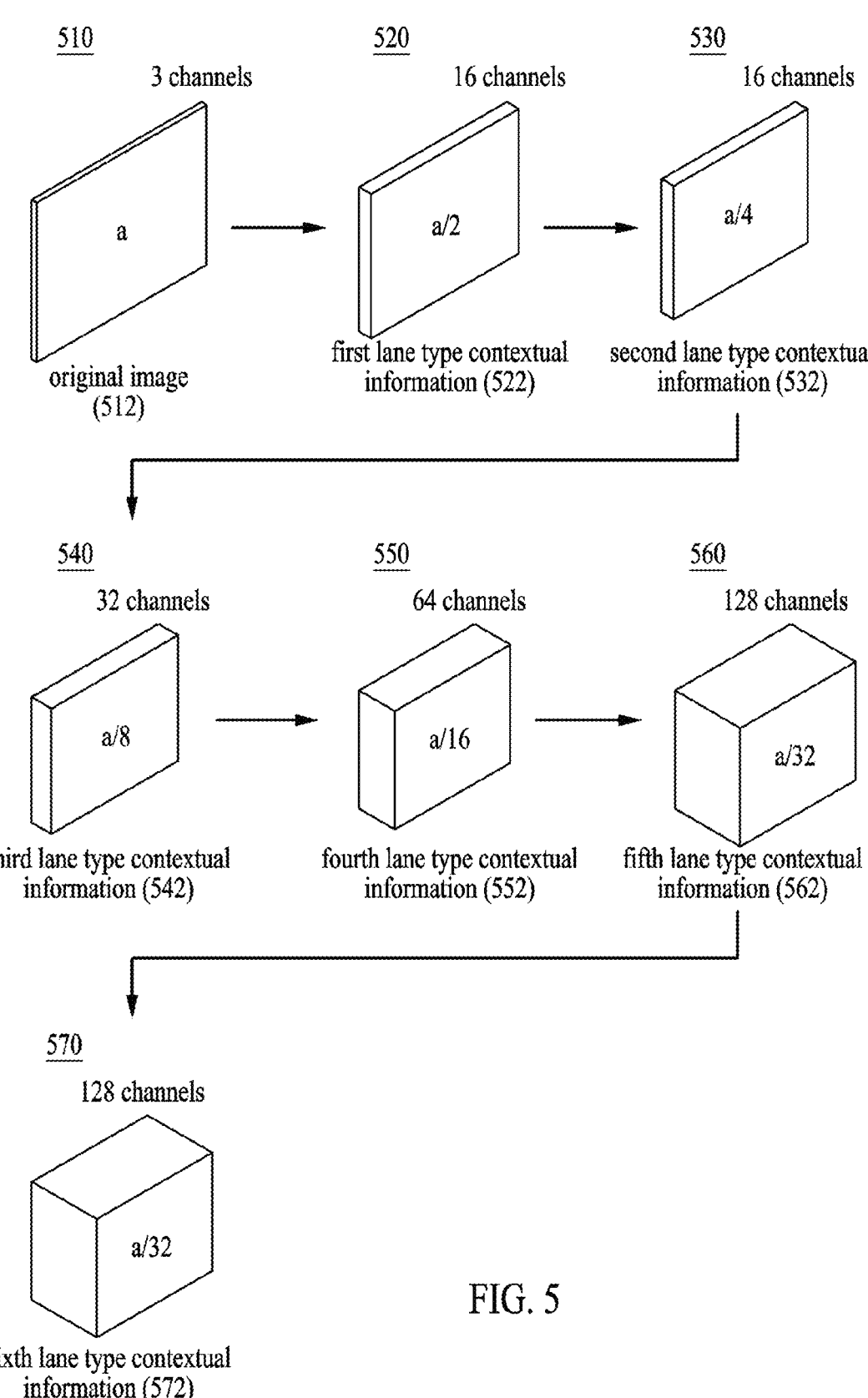
FIG. 5 illustrates a method of generating lane type contextual information according to one embodiment.

FIG. 5 illustrates a method of generating lane type contextual information according to one embodiment.

According to one embodiment, operation 510 may be an operation (e.g., operation 310 of FIG. 3) for receiving an original image, and operations 520 and 570 may be operations (e.g., operation 340 of FIG. 3) for generating lane type contextual information based on the original image.

In operation 510, the electronic device 200 may receive an original image 512. For example, the original image may have the size of a and 3 channels.

In operation 520, the electronic device 200 may generate first lane type contextual information 522 using a stem layer receiving the original image 512 as an input. For example, the first lane type contextual information 522 may have the size of a/2 and 16 channels.

In operation 530, the electronic device 200 may generate second lane type contextual information 532 by using a stem layer receiving the first lane type contextual information 522 as an input. For example, the second lane type contextual information 532 may have the size of a/4 and 16 channels.

In operation 540, the electronic device 200 may generate third lane type contextual information 542 by using a GE layer receiving the second lane type contextual information 532 as an input. For example, the third lane type contextual information 542 may have the size of a/8 and 32 channels.

In operation 550, the electronic device 200 may generate fourth lane type contextual information 552 by using a GE layer receiving the third lane type contextual information 542 as an input. For example, the fourth lane type contextual information 552 may have the size of a/16 and 64 channels.

In operation 560, the electronic device 200 may generate fifth lane type contextual information 562 by using a GE layer receiving the fourth lane type contextual information 552 as an input. For example, the fifth lane type contextual information 562 may have the size of a/32 and 128 channels.

In operation 570, the electronic device 200 may generate sixth lane type contextual information 572 by using a CE layer receiving the fifth lane type contextual information as an input. For example, the sixth lane type contextual information 572 may have the size of a/32 and 128 channels. The sixth lane type contextual information 572 may correspond to the lane type contextual information generated in operation 330.

Figure 6:
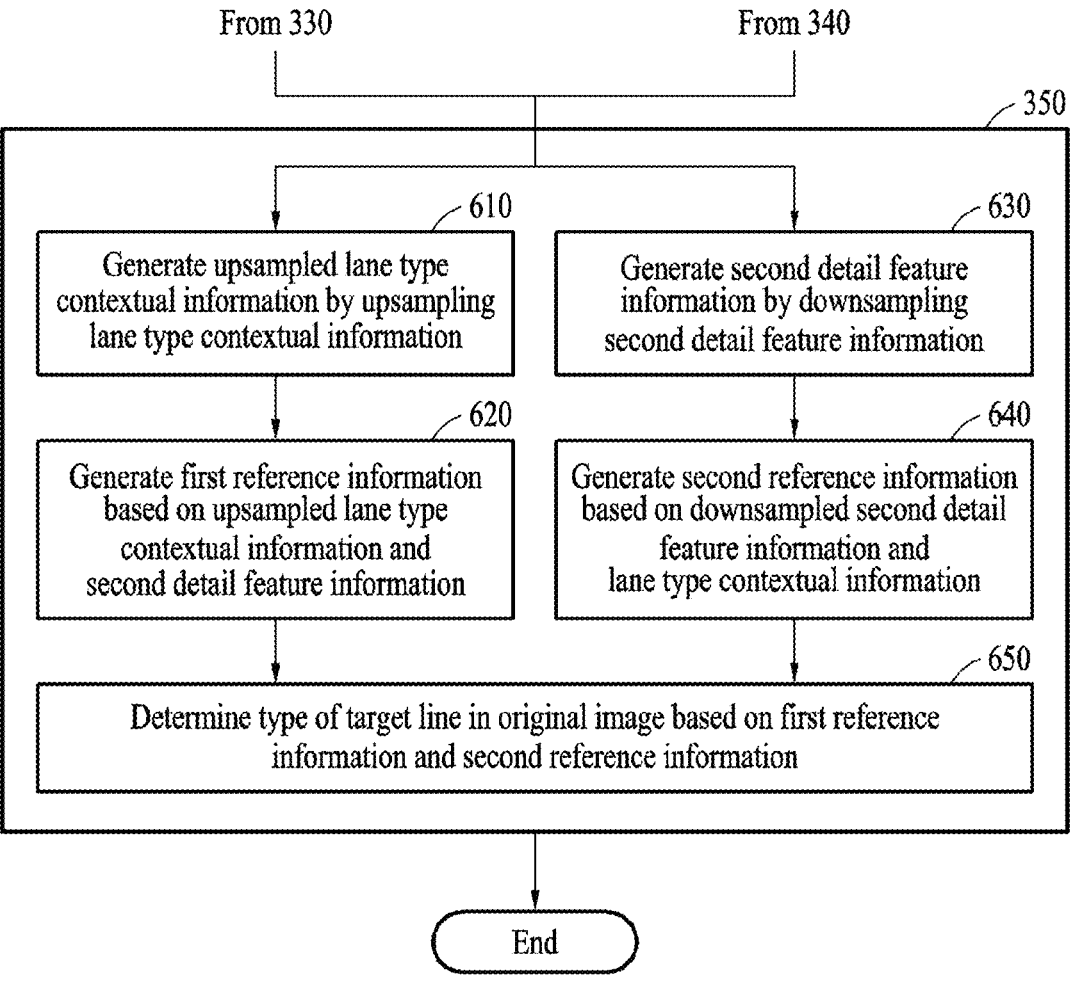
FIG. 6 is a flowchart of a method of determining a type of a target line in an image according to one embodiment.

FIG. 6 is a flowchart of a method of determining a type of a target line in an image according to one embodiment.

According to one embodiment, operation 350 described above with reference to FIG. 3 may include operations 610 to 650 to be described hereinafter.

In operation 610, the electronic device 200 may generate upsampled lane type contextual information by upsampling lane type contextual information. For example, the electronic device 200 may upsample the lane type contextual information to correspond to the size of the second detail feature information. For example, when the size of the lane type contextual information is a/32 and the size of the second detail feature information is a/8, the size of the upsampled lane type contextual information may be a/8.

In operation 620, the electronic device 200 may generate first reference information based on the upsampled lane type contextual information and the second detail feature information. For example, the first reference information may be generated by multiplying the upsampled lane type contextual information by the second detail feature information. To generate the first reference information, the upsampled lane type contextual information may be multiplied by a first weight and the second detail feature information may be multiplied by a second weight. For example, the first weight and the second weight may be predetermined through a training process of a model.

In operation 630, the electronic device 200 may generate downsampled second detail feature information by down-sampling the second detail feature information. For example, the electronic device 200 may downsample the second detail feature information to correspond to the size of the lane type contextual information. For example, when the size of the lane type contextual information is a/32 and the size of the second detail feature information is a/8, the size of the downsampled second detail feature information may be a/32.

In operation 640, the electronic device 200 may generate second reference information based on the downsampled second detail feature information and the lane type contextual information. For example, the second reference information may be generated by multiplying the downsampled second detail feature information by the lane type contextual information. To generate the second reference information, the downsampled second detail feature information may be multiplied by a third weight, and the lane type contextual information may be multiplied by a fourth weight. For example, the third weight and the fourth weight may be predetermined through a training process of a model.

In operation 650, the electronic device 200 may determine the type of the target line in the original image based on the first reference information and the second reference information. The type of line may be determined for each of line pixels in the original image.

According to one embodiment, the electronic device 200 may generate first fusion information by fusing the first reference information and the second reference information. For example, the first fusion information may be generated by using weights set to the first reference information and the second reference information, respectively. The weights related to the first reference information and the second reference information may be predetermined through a training process of a model.

According to one embodiment, the electronic device 200 may determine the type of line by applying argmax or softargmax to the first fusion information. For example, the type of line may be determined for each category of a preset type. For example, the category type may include whether the line is a single line or a double line. As another example, the category type may include whether the line is a dotted line or a solid line. As another example, the category type may include a color of the line.

Figure 7:
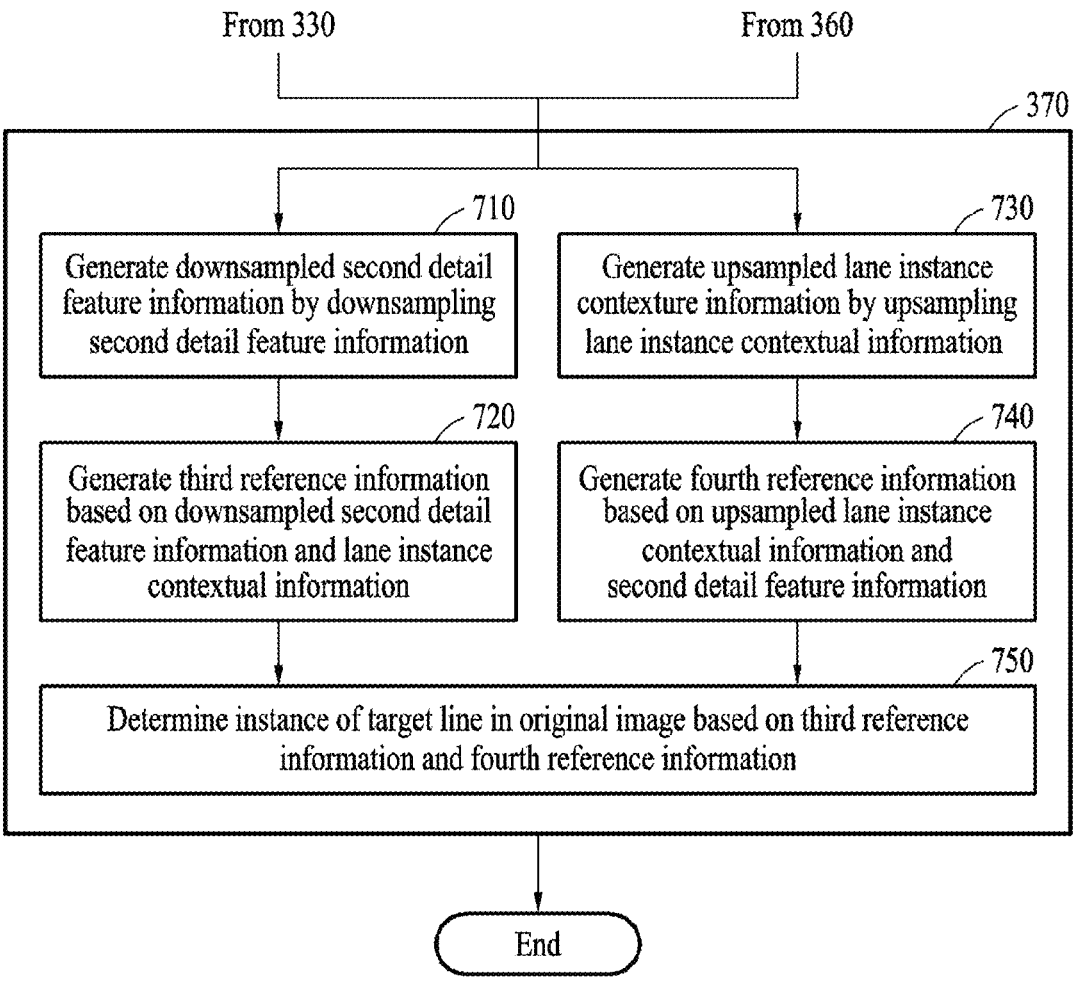
FIG. 7 is a flowchart of a method of determining an instance of a target line in an image according to one embodiment.

FIG. 7 is a flowchart of a method of determining an instance of a target line in an image according to one embodiment.

According to one embodiment, operation 370 described above with reference to FIG. 3 may include operations 710 to 750 to be described hereinafter.

In operation 710, the electronic device 200 may generate downsampled second detail feature information by down-sampling the second detail feature information. For example, the electronic device 200 may downsample the second detail feature information to correspond to the size of lane instance contextual information. For example, when the size of the lane instance contextual information is a/32 and the size of the second detail feature information is a/8, the size of the downsampled second detail feature information may be a/32.

In operation 720, the electronic device 200 may generate third reference information based on the downsampled second detail feature information and the lane instance contextual information. For example, the third reference information may be generated by multiplying the downsampled second detail feature information by the lane instance contextual information. To generate the third reference information, the downsampled second detail feature information may be multiplied by a fifth weight and the lane instance contextual information may be multiplied by a sixth weight. For example, the fifth weight and the sixth weight may be predetermined through a training process of a model.

In operation 730, the electronic device 200 may generate upsampled lane instance contextual information by upsampling the lane instance contextual information. For example, the electronic device 200 may upsample the lane instance contextual information to correspond to the size of the second detail feature information. For example, when the size of the lane instance contextual information is a/32 and the size of the second detail feature information is a/8, the size of the upsampled lane instance contextual information may be a/8.

In operation 740, the electronic device 200 may generate fourth reference information based on the upsampled lane instance contextual information and the second detail feature information. For example, the fourth reference information may be generated by multiplying the upsampled lane instance contextual information by the second detail feature information. To generate the fourth reference information, the upsampled lane instance contextual information may be multiplied by a seventh weight and the second detail feature information may be multiplied by an eighth weight. For example, the seventh weight and the eighth weight may be predetermined through a training process of a model.

In operation 750, the electronic device 200 may determine the instance of the target line in the original image based on the third reference information and the fourth reference information. The instance of line may be determined for each of road pixels in the original image.

According to one embodiment, the electronic device 200 may generate second fusion information by fusing the third reference information and the fourth reference information. For example, the second fusion information may be generated by using weights set to the third reference information and the fourth reference information, respectively. The weights related to the third reference information and the fourth reference information may be predetermined through a training process of a model.

According to one embodiment, the electronic device 200 may distinguish lines appearing in the original image based on the second fusion information and may determine instances for the distinguish lines. For example, the electronic device 200 may connect partial lines having the same instance and may assign an instance of a line to pixels located on a line connected by the partial lines in an area (e.g., road pixels) without a feature of the line in the image.

According to one embodiment, the electronic device 200 may determine the instance of line by applying argmax or softargmax to the second fusion information. For example, one of preset instances may be determined for the target line (or the partial line). For example, an instance determined for a target line may include at least one of a left line of a target lane on which the vehicle drives, a right line of the target lane, a line of a left lane of the target lane, and a line of a right lane of the target lane.

Figure 8:
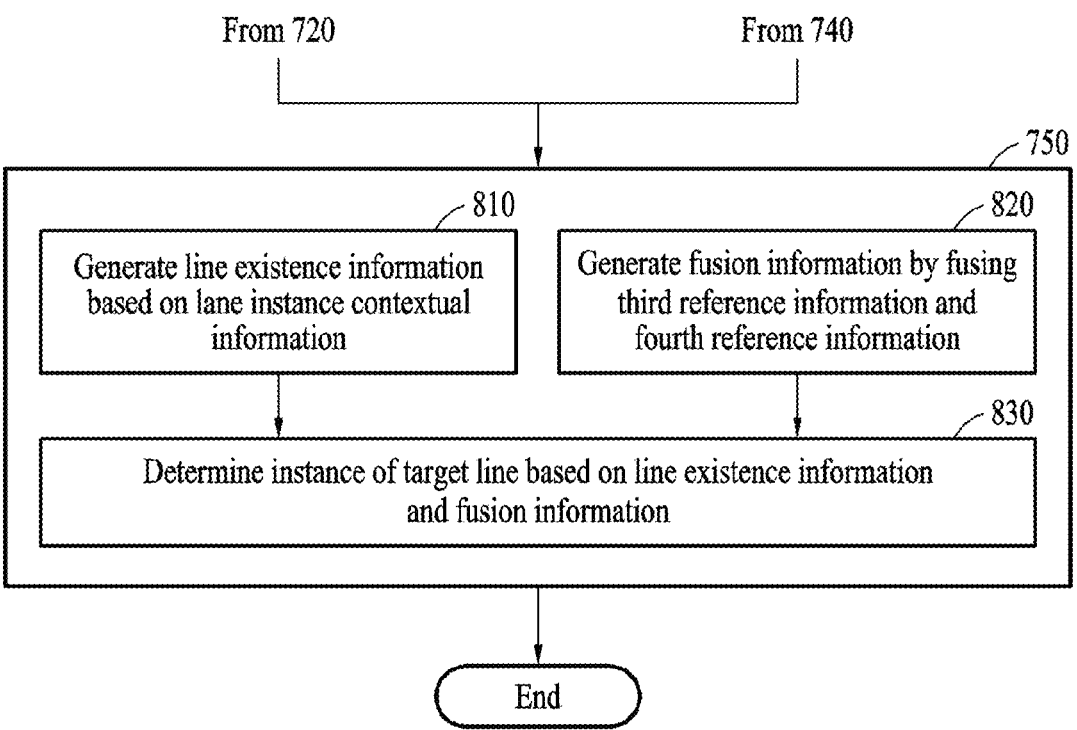
FIG. 8 is a flowchart of a method of determining an instance of a target line based on line existence information according to one embodiment.

FIG. 8 is a flowchart of a method of determining an instance of a target line based on line existence information according to one embodiment.

According to one embodiment, operation 750 described above with reference to FIG. 7 may include operations 810 to 830 to be described hereinafter.

In operation 810, the electronic device 200 may generate line existence information based on lane instance contextual information. For example, the electronic device 200 may determine whether a target line exists by using layers which determine whether a line exists. The layers determining whether a line exists may receive the lane instance contextual information as an input and may output whether the target line exists. The line existence information may be used to prevent false detection of a line.

In operation 820, the electronic device 200 may generate fusion information (e.g., the second fusion information of FIG. 7) by fusing the third reference information and the fourth reference information. The description of operation 750 of FIG. 7 may be similarly applied to the description of the method of generating the fusion information.

In operation 830, the electronic device 200 may determine the instance of the target line based on the line existence information and the fusion information. For example, even if a target line is detected based on the fusion information, when it is determined that the line does not exist by the line existence information, it may be finally determined that the line does not exist and an instance for the non-existent line may not be determined. In other words, an instance of a line may be determined only for a line that is determined to exist by the line existence information.

Figure 9:
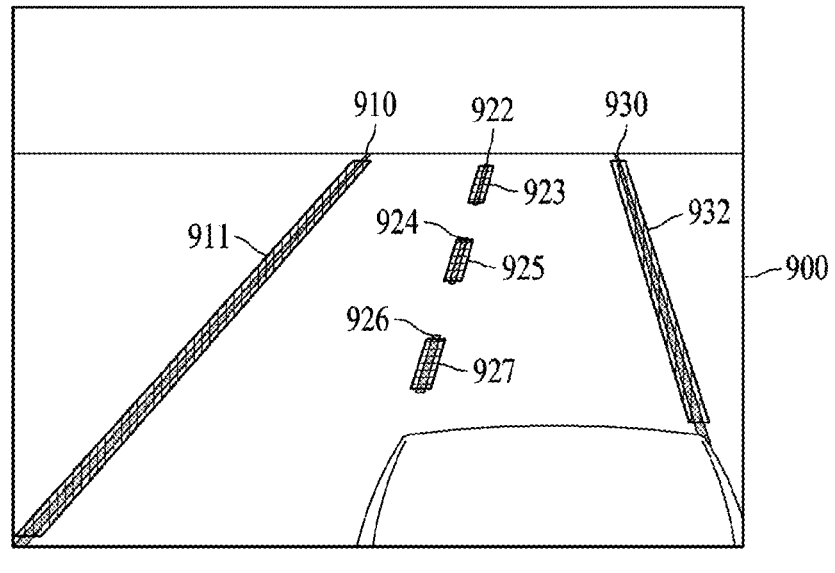
FIG. 9 illustrates an output graphic effect based on a type of a line in an image according to one embodiment.

FIG. 9 illustrates an output graphic effect based on a type of a line in an image according to one embodiment.

According to one embodiment, respective line types determined for lines 910, 922, 924, and 930 shown in an original image 900 may be described using a graphic effect. For example, a shown graphic effect may be output to a driver (or a user) of a vehicle or may not be output. The shown graphic effect is only intended to help understanding of a "type of a line" described by data processing and may not be implemented actually. For example, the electronic device 200 may assign an index corresponding to the graphic effect to a corresponding line.

For example, as the type of the lines 910 and 930, a white color, a single line, and a solid line may be determined. A graphic effect having a first pattern may be determined for the white color, the single line, and the solid line. A graphic effect 911 having the first pattern may be applied to the lines 910 and 930.

For example, the white color, the single line, and a dotted line may be determined to be the types of lines 922, 924, and 926. A graphic effect having a fourth pattern may be determined for the white color, the single line, and the dotted line. Graphic effects 923, 925, and 927 having the fourth pattern may be applied to the lines 922, 924, and 926, respectively.

For example, although not shown in the drawings, a yellow color, a single line, and a solid line may be determined to be the type of line. A graphic effect having a second pattern may be determined for the yellow color, the single line, and the solid line.

For example, although not shown in the drawings, a yellow color, a double line, and a solid line may be determined to be the type of line. A graphic effect having a third pattern may be determined for the yellow color, the double line, and the solid line.

Figure 10:
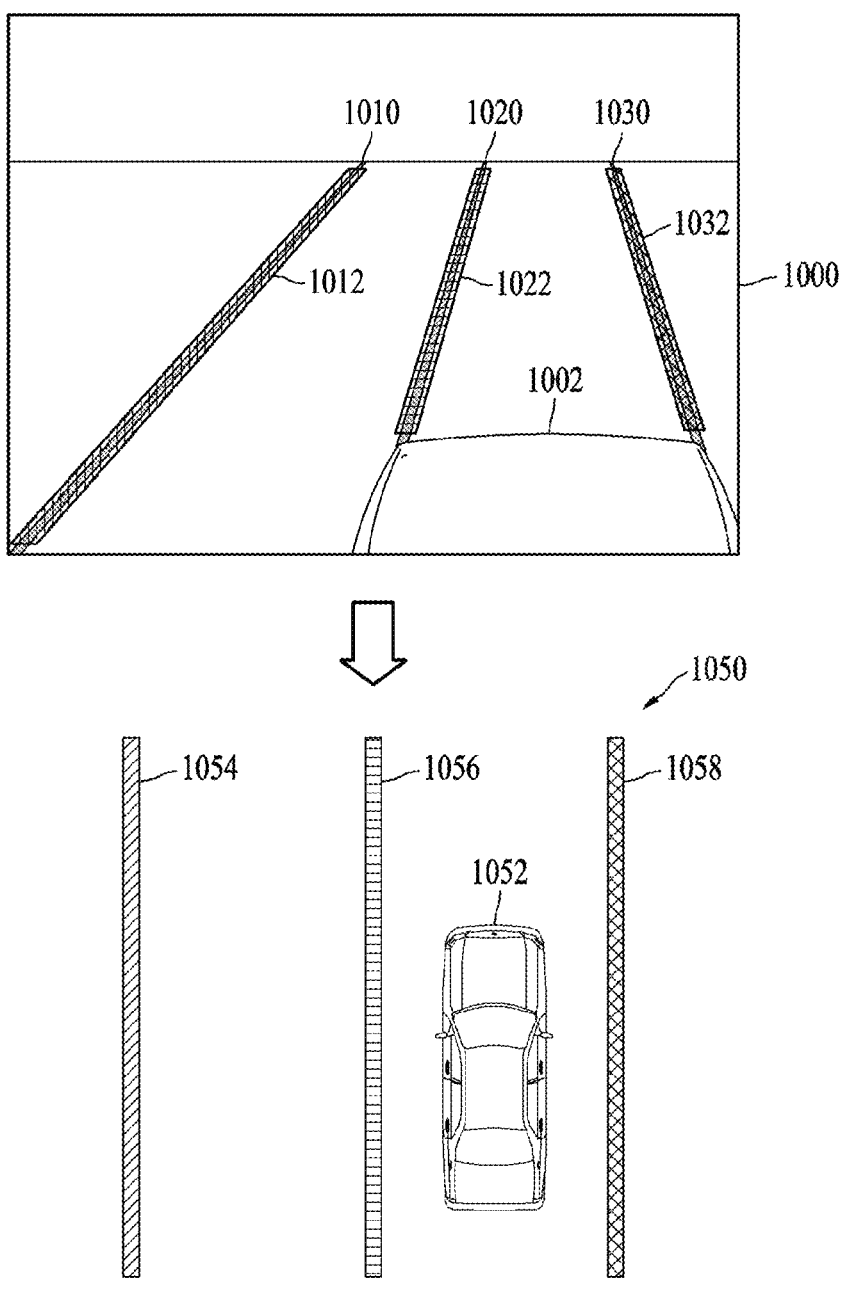
FIG. 10 illustrates an output graphic effect output based on an instance of a line in an image according to one embodiment.

FIG. 10 illustrates an output graphic effect output based on an instance of a line in an image according to one embodiment.

According to one embodiment, respective line instances determined for lines 1010, 1020, and 1030 shown in an original image 1000 may be described using a graphic effect. For example, a shown graphic effect may be output to a driver (or a user) of a vehicle or may not be output. The shown graphic effect is only intended to help with the understanding of "an instance of a line" described by data processing and may not be implemented actually. For example, the electronic device 200 may assign an index corresponding to the graphic effect to a corresponding line.

For example, a left line of a driving lane may be determined to be an instance for a line 1020, a right line of the driving lane may be determined to be an instance for a line 1030, and a line of a left lane of the driving lane may be determined to be an instance for a line 1010.

Graphic effects 1012, 1022, and 1032 corresponding to determined instances may be output to the lines 1010, 1020, and 1030, respectively.

According to one embodiment, instances of lines around a vehicle may be visually provided (or output) to a driver (or a user) of the vehicle. For example, an around view 1050 in which instances for lines 1054, 1056, and 1058 are distinguished by color based on a vehicle image 1052 may be output.

Figure 11A:
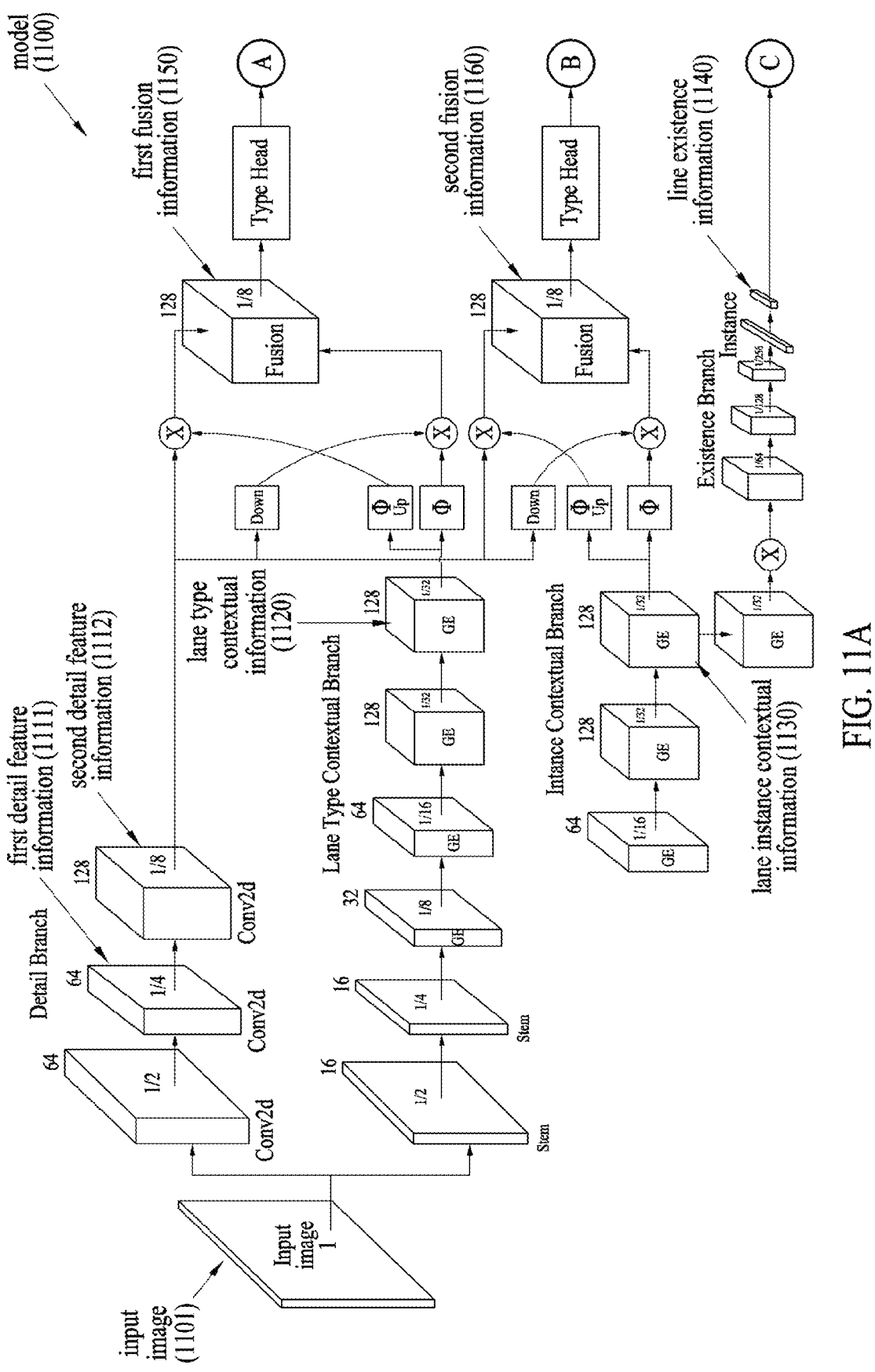
FIG. 11A is a conceptual image of a model for determining a type of a line and FIG. 11B is an instance of the line based on an original image according to one embodiment.
Figure 11B:
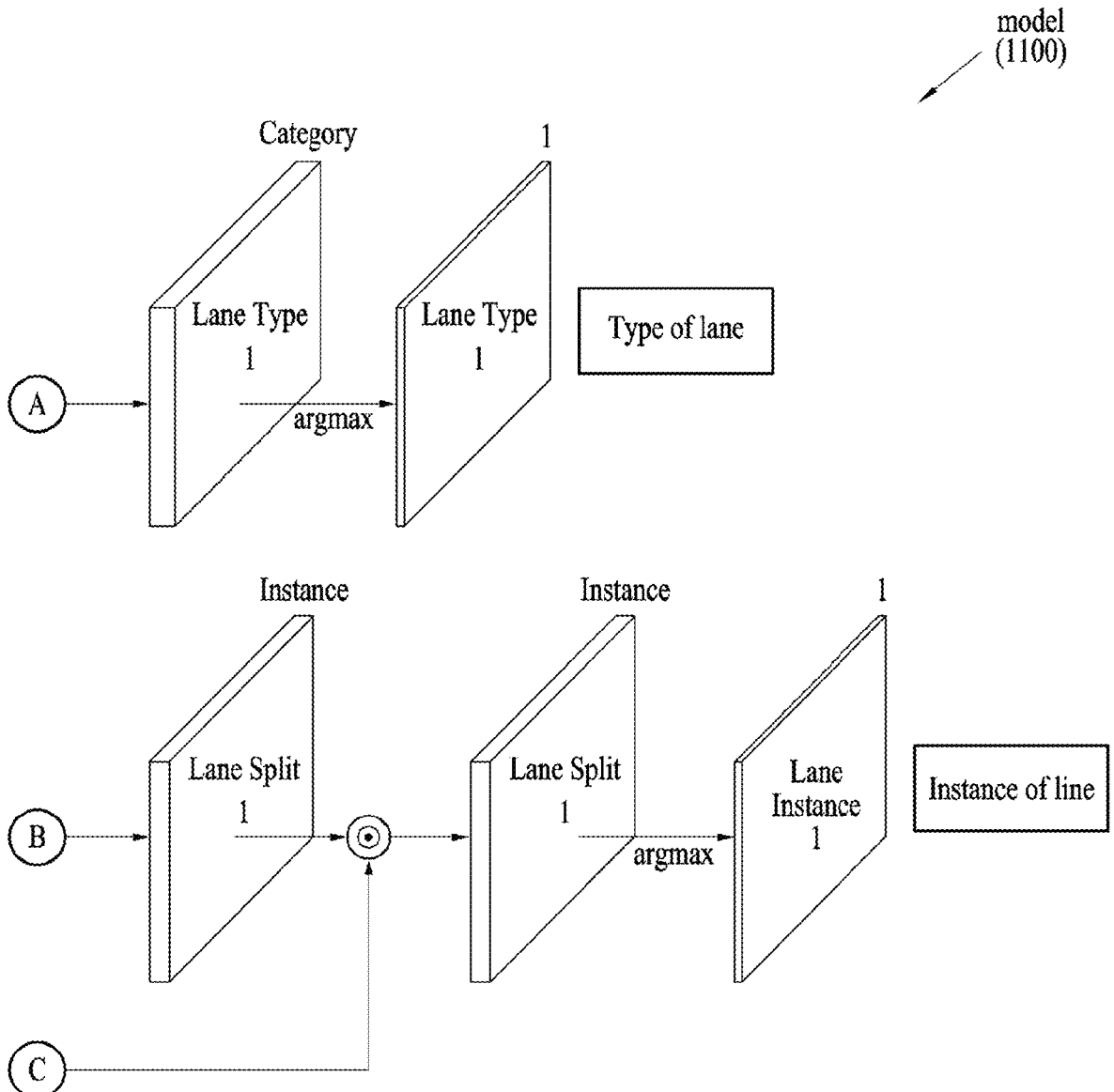

FIG. 11A is a conceptual image of a model for determining a type of a line and FIG. 11B is an instance of the line based on an original image according to one embodiment.

According to one embodiment, a model 1100 may simultaneously determine a type of a line and an instance of the line based on an input image 1101. For example, the model 1100 may include a plurality of layers. Parameter values (or weights) of edges connecting nodes of the layers may be predetermined through training of the model 1100.

For example, the model 1100 may include a detail branch that generates first detail feature information 1111 and second detail feature information 1112.

For example, the model 1100 may include a lane type contextual branch that generates lane type contextual information 1120.

For example, the model 1100 may include an instance contextual branch that generates lane instance contextual information 1130.

For example, the model 1100 may include an existence branch that generates line existence information 1140.

For example, the model 1100 may include layers configured to generate first fusion information 1150 based on second detail feature information 1112 and lane type contextual information 1120 and determine the type of lane based on the first fusion information 1150.

For example, the model 1100 may include layers configured to generate second fusion information 1160 based on the second detail feature information 1112 and the lane instance contextual information 1130 and layers configured to determine the instance of line based on the second fusion information 1160 and the line existence information 1140.

The methods according to the embodiments described herein may be recorded in non-transitory computer-readable media including program instructions to implement various operations of the embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape, optical media such as CD-ROM discs, DVDs, and/or Blue-ray discs, magneto-optical media such as optical discs, and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An image processing method performed by an electronic device, the image processing method comprising:

receiving an original image generated by using a camera mounted on a vehicle;

generating first detail feature information by processing the original image in a preset first scheme that applies one or more first convolutional layers to the original image and generating second detail feature information by processing the first detail feature information in a preset second scheme that applies one or more second convolutional layers to the first detail feature information;

generating lane type contextual information by processing the original image in a preset third scheme that applies one or more third convolution layers, parameters of which are pre-trained to perform stem, gather and expansion (GE) and context embedding (CE) on the original image;

determining a type of a target line in the original image based on the second detail feature information and the lane type contextual information;

generating lane instance contextual information by processing the first detail feature information in a preset fourth scheme that applies one or more fourth convolutional layers, parameters of which are pretrained to perform gather and expansion (GE) and context embedding (CE); and determining an instance of the target line based on the second detail feature information and the lane instance contextual information wherein the instance of the target line is information on a relative position of the target line based on a position of the vehicle, and wherein the determining of the type of the target line comprises:

generating upsampled lane type contextual information by upsampling the lane type contextual information;

generating first reference information based on the upsampled lane type contextual information and the second detail feature information;

generating downsampled second detail feature information by downsampling the second detail feature information;

generating second reference information based on the downsampled second detail feature information and the lane type contextual information; and determining the type of the target line in the original image based on the first reference information and the second reference information.

2. The image processing method of claim 1, wherein the type of the target line comprises at least one of a solid line, a dotted line, a single line, a double line, and a color.

3. The image processing method of claim 1, wherein the instance of the target line comprises at least one of a left line of a target lane on which the vehicle drives, a right line of the target lane, a line of a left lane of the target lane, and a line of a right lane of the target lane.

4. The image processing method of claim 1, wherein the determining of the instance of the target line comprises:

generating downsampled second detail feature information by downsampling the second detail feature information;

generating third reference information based on the downsampled second detail feature information and the lane instance contextual information;

generating upsampled lane instance contextual information by upsampling the lane instance contextual information;

generating fourth reference information based on the upsampled lane instance contextual information and the second detail feature information; and determining the instance of the target line in the original image based on the third reference information and the fourth reference information.

5. The image processing method of claim 4, wherein the determining of the instance of the target line in the original image based on the third reference information and the fourth reference information comprises:

generating line existence information based on the line instance contextual information;

generating fusion information by fusing the third reference information and the fourth reference information; and determining the instance of the target line based on the line existence information and the fusion information.

6. The image processing method of claim 1, wherein the image processing method is performed by a model pre-trained based on a neural network.

7. The image processing method of claim 1, further comprising:

controlling the vehicle based on at least one of the type and the instance of the target line.

8. A non-transitory computer-readable storage medium storing instructions that, when executed by a processor, cause the processor to perform the image processing method of claim 1.

9. An electronic device comprising:

a memory configured to store a program for processing an image; and a processor configured to execute the program, wherein the processor is configured to:

receive an original image generated by using a camera mounted on a vehicle, generate first detail feature information by processing the original image in a preset first scheme that applies one or more first convolutional layers to the original image and generate second detail feature information by processing the first detail feature information in a preset second scheme that applies one or more second convolutional layers to the first detail feature information, generate lane type contextual information by processing the original image in a preset third scheme that applies one or more third convolution layers, parameters of which are pre-trained to perform stem, gather and expansion (GE) and context embedding (CE) on the original image, determine a type of a target line in the original image based on the second detail feature information and the lane type contextual information, generate lane instance contextual information by processing the first detail feature information in a preset fourth scheme that applies one or more fourth convolutional layers, parameters of which are pretrained to perform gather and expansion (GE) and context embedding (CE), and determine an instance of the target line based on the second detail feature information and the lane instance contextual information wherein the instance of the target line is information on a relative position of the target line based on a position of the vehicle, and wherein the processor is configured to:

generate upsampled lane type contextual information by upsampling the lane type contextual information, generate first reference information based on the upsampled lane type contextual information and the second detail feature information, generate downsampled second detail feature information by downsampling the second detail feature information, generate second reference information based on the downsampled second detail feature information and the lane type contextual information, and determine the type of the target line in the original image based on the first reference information and the second reference information.

10. The electronic device of claim 9, wherein the type of the target line comprises at least one of a solid line, a dotted line, a single line, a double line, and a color.

11. The electronic device of claim 9, wherein the instance of the target line comprises at least one of a left line of a target lane on which the vehicle drives, a right line of the target lane, a line of a left lane of the target lane, and a line of a right lane of the target lane.

12. The electronic device of claim 9, wherein the processor is configured to:

generate downsampled second detail feature information by downsampling the second detail feature information, generate third reference information based on the downsampled second detail feature information and the lane instance contextual information, generate upsampled lane instance contextual information by upsampling the lane instance contextual information, generate fourth reference information based on the upsampled lane instance contextual information and the second detail feature information, and determine the instance of the target line in the original image based on the third reference information and the fourth reference information.

13. The electronic device of claim 12, wherein the processor is configured to:

generate line existence information based on the line instance contextual information, generate fusion information by fusing the third reference information and the fourth reference information, and determine the instance of the target line based on the line existence information and the fusion information.

14. The electronic device of claim 9, wherein the electronic device is comprised in the vehicle.

15. The electronic device of claim 9, wherein the processor is configured to:

control the vehicle based on the type and the instance of the target line.

16. A vehicle control method performed by an electronic device, the vehicle control method comprising:

receiving an original image generated by using a camera mounted on a vehicle;

generating first detail feature information by processing the original image in a preset first scheme that applies one or more first convolutional layers to the original image and generating second detail feature information by processing the first detail feature information in a preset second scheme that applies one or more second convolutional layers to the first detail feature information;

generating lane type contextual information by processing the original image in a preset third scheme that applies one or more third convolution layers, parameters of which are pre-trained to perform stem, gather and expansion (GE) and context embedding (CE) on the original image;

determining a type of a target line in the original image based on the second detail feature information and the lane type contextual information;

generating lane instance contextual information by processing the first detail feature information in a preset fourth scheme that applies one or more fourth convolutional layers, parameters of which are pretrained to perform gather and expansion (GE) and context embedding (CE);

determining an instance of the target line based on the second detail feature information and the lane instance contextual information wherein the instance of the target line is information on a relative position of the target line based on a position of the vehicle; and controlling the vehicle based on at least one of the type and the instance of the target line, and wherein the determining of the type of the target line comprises:

generating upsampled lane type contextual information by upsampling the lane type contextual information;

generating first reference information based on the upsampled lane type contextual information and the second detail feature information;

generating downsampled second detail feature information by downsampling the second detail feature information;

generating second reference information based on the downsampled second detail feature information and the lane type contextual information; and determining the type of the target line in the original image based on the first reference information and the second reference information.

\* \* \* \* \*